Nov. 8, 1938.   E. G. RITCHIE   2,135,770
PIPE SYSTEM
Filed Oct. 27, 1936
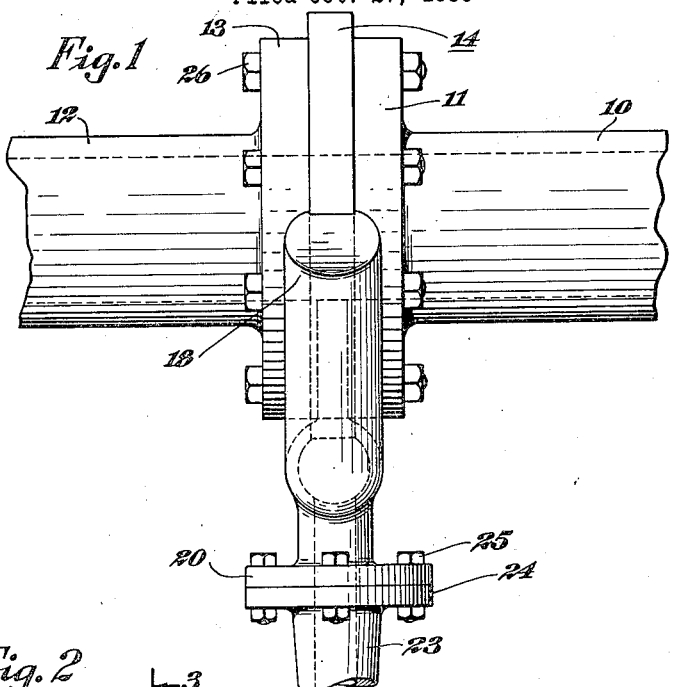
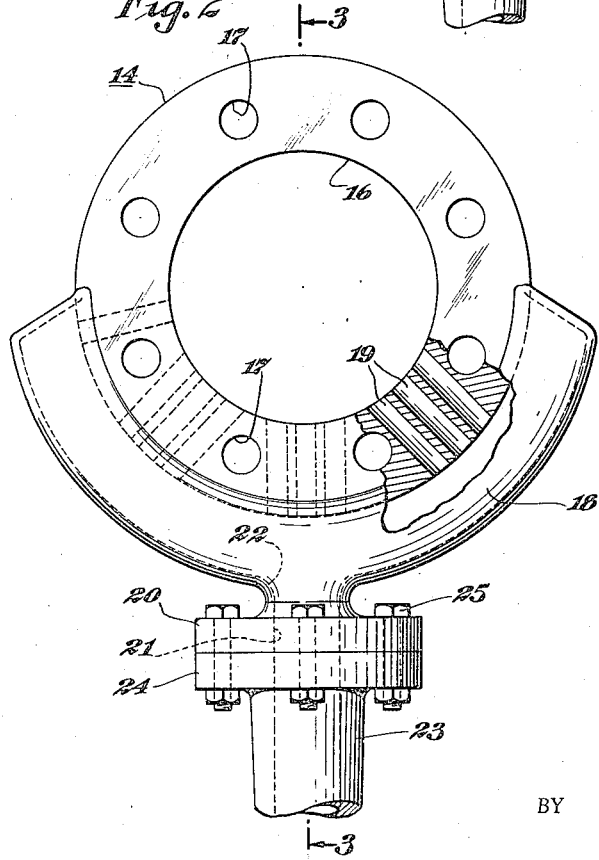
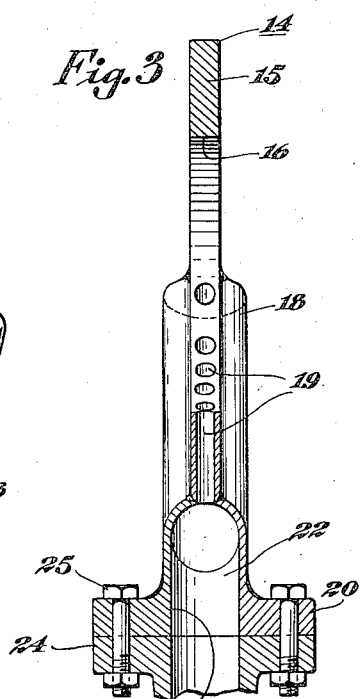
INVENTOR.
Ernest Guthrie Ritchie
BY Jarvis C. Markle
his ATTORNEY.

Patented Nov. 8, 1938

2,135,770

UNITED STATES PATENT OFFICE 2,135,770

PIPE SYSTEM

Ernest Guthrie Ritchie, London, England

Application October 27, 1936, Serial No. 107,749
In Great Britain November 8, 1935

4 Claims. (Cl. 285—131)

My invention relates to a pipe fitting and more particularly to a fitting which may be inserted between the ends of two flanged pipes for the purpose of connecting a branch pipe thereto.

Heretofore, when it has been desired to connect a branch to an existing pipe line, it has been necessary to cut out a section of the pipe and to insert a T. In accordance with my invention, which is applicable to pipes having flanged ends, it is merely necessary to unbolt one of the flanged joints and to insert my improved pipe fitting therebetween.

Further objects and advantages of my invention will be apparent from the following description when considered in connection with the accompanying drawing forming a part of this specification and of which Fig. 1 is a side view of my improved fitting installed in a pipe line;

Fig. 2 is an end view, partially broken away, of my improved fitting; and

Fig. 3 is a cross-sectional view taken on the line 3—3 of Fig. 2.

Referring to the drawing, reference character 10 designates a pipe having a flanged end 11, and reference character 12 designates a similar pipe having a flanged end 13. As originally installed, pipes 10 and 12 were connected together by means of bolts passing through holes formed in their respective flanges.

As shown in Fig. 1, flanges 11 and 13 have been separated and there has been inserted therebetween a fitting 14. This fitting includes a flat disc shaped member 15 of a diameter somewhat greater than the outer diameter of the flanges 11 and 13 and having a central opening 16 of a diameter substantially equal to that of the inner diameter of pipes 10 and 12. Flange or disc 15 is provided with a plurality of bolt holes 17 corresponding in number, size, and spacing to the bolt holes formed in flanges 11 and 13. A manifold 18 extends around substantially one-half of the outer diameter of flange 15 and is secured to the flange in any suitable fluid tight manner, as by welding. In the half of the flange which is surrounded by manifold 18 there are formed a plurality of radially extending passages 19. These passages are arranged between bolt holes 17 so that there is no communication between the passages and the bolt holes. The passages 19 connect the annular space within disc 15 with the interior of manifold 18.

Secured to the outer circumference of manifold 18 in any suitable manner, such as by welding, is a flange 20 having a bore 21 which is in alignment with a passage 22 formed in the manifold and communicating with the interior thereof. A branch pipe 23 is provided with a flange 24 which is secured to flange 20 by bolts 25.

In order to install my improved fitting between the flanges 11 and 13 of pipes 10 and 12, respectively, the bolts 26 securing these flanges together are removed and the flanges are separated slightly. This may be done by springing the pipe line, which includes pipes 10 and 12 sufficiently to permit disc 15 to be inserted therebetween. As installed, pipe lines have sufficient spring to permit this, and the disc 15 is made as thin as possible so that the amount of displacement of the flanges 11 and 13 is a minimum.

After disc 15 has been inserted between flanges 11 and 13, bolts 26 are replaced and tightened, thus clamping the disc in fluid tight relation between flanges 11 and 13. Thereafter, branch pipe 23 may be connected by bolting the flange 24 thereon to the flange 20 of fitting 14.

A certain amount of the fluid flowing through pipes 10 and 12 flows through passages 19 in a disc 15 to the interior of manifold 18. From here the fluid flows through passage 22 and bore 21 to branch pipe 23.

Should it be desired later to remove the branch pipe, this may be done by removing the bolts 26 and the disc 15 and then bolting the flanges 11 and 13 together. Thus the pipe line is restored to its original condition.

While I have described one more or less specific embodiment of my invention, it is to be understood that this has been done for purposes of illustration only and that the scope of my invention is not to be limited thereby but is to ge determined by the appended claims viewed in the light of the prior art.

What I claim is:

1. A fitting for insertion between the flanges in a pipe line and serving for the inflow or outflow of part of the fluid in the pipe line including a disc of greater external diameter than the flanges and having an inner opening for the main stream, a manifold secured to the outer edge of the disc radially beyond the flanges, said disc being formed with radially extending passages communicating with the interior of said manifold, and means for securing a branch pipe to said manifold radially beyond said flanges.

2. A fitting for insertion between the flange in the pipe system and serving for the inflow and outflow of part of the fluid in the pipe system including a disc of greater external diameter than the flanges and having an inner opening for the main stream, the diameter of said inner opening being approximately equal to the inner diameter of the pipe system, and a manifold secured to the outer edge of the disc radially beyond the flanges said disc being formed with passages extending substantially at right angles to the axis of the disc and being formed with holes for clamping bolts extending parallel to the axis of the disc between said passages, and means for securing a branch pipe to said manifold radially beyond said flanges.

3. A fitting for insertion between the flanges in a pipe line and serving for the inflow or outflow of part of the fluid in the pipe line including a disc of greater external diameter than the flanges and having an inner opening for the main stream, a manifold secured to the outer edge of the disc radially beyond the flanges, said manifold being thicker than said disc, said disc being formed with a plurality of radially extending passages establishing communication between said inner opening and said manifold, and means for connecting a branch pipe to said manifold, the diameter of said branch pipe being greater than the thickness of said disc.

4. A fitting for insertion between the flanges in a pipe line and serving for the inflow or outflow of part of the fluid in the pipe line including a disc of greater external diameter than the flanges and having an inner opening for the main stream, a manifold secured to the outer edge of the disc radially beyond the flanges, said manifold extending not more than half-way around said disc and being thicker than said disc, said disc being formed with a plurality of radially extending passages establishing communication between said inner opening and said manifold, and means for securing a branch pipe to said manifold radially beyond said flanges.

ERNEST GUTHRIE RITCHIE.